(12) United States Patent
Jayaraman et al.

(10) Patent No.: US 11,768,723 B2
(45) Date of Patent: Sep. 26, 2023

(54) METHOD AND SYSTEM FOR PREDICTING FAILURES IN INTERCONNECTED SYSTEMS BASED ON QUANTUM COMPUTING

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Karnataka (IN)

( * ) Notice: Subject to any disclaimer, the term of this patent is extended or adjusted under 35 U.S.C. 154(b) by 556 days.

(21) Appl. No.: 16/832,062

(22) Filed: Mar. 27, 2020

(65) Prior Publication Data

US 2021/0256411 A1 Aug. 19, 2021

(30) Foreign Application Priority Data

Feb. 13, 2020 (IN) .............................. 202041006355

(51) Int. Cl.
| | |
|---|---|
| *G06F 11/00* | (2006.01) |
| *G06N 10/00* | (2022.01) |
| *G06N 20/00* | (2019.01) |
| *G06F 18/23* | (2023.01) |

(52) U.S. Cl.
CPC ............ *G06F 11/008* (2013.01); *G06F 18/23* (2023.01); *G06N 10/00* (2019.01); *G06N 20/00* (2019.01)

(58) Field of Classification Search
CPC ...... G06N 10/00; G06N 20/00; G06F 11/008; G06K 9/6218; G06K 9/6276
USPC .......................................................... 706/62
See application file for complete search history.

(56) References Cited

U.S. PATENT DOCUMENTS

| | | | |
|---|---|---|---|
| 2004/0014097 A1 | 1/2004 | McGlennen et al. | |
| 2014/0244552 A1* | 8/2014 | Liu .......................... | E21B 41/00 706/12 |
| 2019/0213504 A1* | 7/2019 | Vasseur .................. | H04W 36/16 |
| 2020/0349395 A1* | 11/2020 | Nushi ..................... | G06K 9/6257 |
| 2020/0401920 A1* | 12/2020 | Killoran ................. | G06N 3/0445 |
| 2020/0410284 A1* | 12/2020 | Kallanagoudar ....... | G06F 12/12 |
| 2021/0389894 A1* | 12/2021 | Zhou ...................... | G06F 9/45558 |

FOREIGN PATENT DOCUMENTS

| | | |
|---|---|---|
| WO | 2017015576 A1 | 1/2017 |
| WO | 2017124138 A1 | 7/2017 |

\* cited by examiner

*Primary Examiner* — James C Kerveros
(74) *Attorney, Agent, or Firm* — Finnegan, Henderson, Farabow, Garrett & Dunner, LLP

(57) ABSTRACT

Method and system for predicting failures in interconnected systems based on quantum computing is disclosed. The method may include identifying a set of unique patterns from input data received from a plurality of input data sources, determining a correlation between at least two input data sources, creating a plurality of sets of clusters corresponding to the plurality of input data sources based on the correlation, extracting data associated with each of the set of unique patterns based on the plurality of sets of clusters, predicting, based on the extracted data, a failure of at least one interconnected system using a trained ML model, processing the extracted data associated with each of the set of unique patterns and information associated with the predicted failure through a quantum computing layer, and generating, through the quantum computing layer, at least one corrective action for the at least one interconnected system.

15 Claims, 8 Drawing Sheets

| KPIs 702 | M0 | M1 | M2 | M3 | M4 | M5 |
|---|---|---|---|---|---|---|
| KPI 702a | | 5% | | 10% | | 15% |
| KPI 702b | | | | 5% | | 10% |
| KPI 702c | | | | 5% | | 5% |
| KPI 702d | | 10% | | 5% | | 5% |
| KPI 702e | | | | | | 5% |
| KPI 702f | | | | 12% | | 15% |

FIG. 7

METHOD AND SYSTEM FOR PREDICTING FAILURES IN INTERCONNECTED SYSTEMS BASED ON QUANTUM COMPUTING

TECHNICAL FIELD

The present disclosure relates generally to quantum computing, and more particularly to method and system for predicting failures in interconnected systems based on quantum computing.

BACKGROUND

Over last few decades, supply chain market has overseen a significant growth. It is estimated that by 2020, the supply chain market may be worth about USD 20 billion. As per a recent survey, 70% of retail and manufacturing companies are constantly updating in terms of digital capabilities, boosting a need for a plurality of interconnecting technologies such as active and passive Radio Frequency Identification (RFID) tags, tags based on antennas or microchips, Bluetooth tags, beacons, near field connected tags, Internet of things (IoT) sensors, monitoring dashboards, Augmented Reality/Virtual Reality (AR/VR), digital process and product twins, and the like. Further, fleet management is becoming increasingly connected by implementing Global Positioning System (GPS) and other tracking technologies. It may be noted that by 2020, over 180 million commercial vehicles (90% of the supply chain market), are expected to include such tracking technologies.

In the present state of art, problems such as getting real-time location of facilities and assets, time-to market, cost reduction, and Year over Year (Y-o-Y) productivity, use of obsolete systems and technologies by the distribution centers, untraceable devices, equipment, and machinery, optimizing a utilization of assets and improving productivity, inability to perform simulations for planning and optimization, and an inability to predict failures due to data isolation are yet to be addressed.

Such challenges indicate a requirement in the supply chain market for improvement in terms of connectivity of a plurality of devices in the supply chain system. Further, it may be required, in the present state of art, to reduce a process response time of each of the plurality of devices in an interconnected supply chain system.

SUMMARY

In one embodiment, a method for predicting failures in interconnected systems based on quantum computing is disclosed. In one example, the method may include identifying, by a failure prediction device, a set of unique patterns from input data received from a plurality of input data sources. The plurality of input data sources may include a plurality of interconnected systems. The method may further include determining, by the failure prediction device, a correlation between at least two of the plurality of input data sources. The method may further include creating, by the failure prediction device, a plurality of sets of clusters corresponding to the plurality of input data sources based on the correlation. Each of the plurality of sets of clusters may include at least two input data sources. For each of the plurality of sets of clusters, correlation between corresponding input data sources may be above a predefined threshold. The method may further include extracting, by the failure prediction device, data associated with each of the set of unique patterns from the input data based on the plurality of sets of clusters. The method may further include predicting, by the failure prediction device, based on the extracted data, a failure of at least one interconnected system from the plurality of interconnected systems using a trained Machine Learning (ML) model. The method may further include processing, by the failure prediction device, the extracted data associated with each of the set of unique patterns and information associated with the predicted failure through a quantum computing layer. The quantum computing layer may use a plurality of qubits. The method may further include generating, by the failure prediction device, through the quantum computing layer, at least one corrective action for the at least one interconnected system.

In another embodiment, a system for predicting failures in interconnected systems based on quantum computing is disclosed. In one example, the system may include a processor, and a computer-readable medium communicatively coupled to the processor. The computer-readable medium may store processor-executable instructions, which when executed by the processor, may cause the processor to identify a set of unique patterns from input data received from a plurality of input data sources. The plurality of input data sources may include a plurality of interconnected systems. The stored processor-executable instructions, on execution, may further cause the processor to determine a correlation between at least two of the plurality of input data sources. The stored processor-executable instructions, on execution, may further cause the processor to create a plurality of sets of clusters corresponding to the plurality of input data sources based on the correlation. Each of the plurality of sets of clusters may include at least two input data sources. For each of the plurality of sets of clusters, correlation between corresponding input data sources may be above a predefined threshold. The stored processor-executable instructions, on execution, may further cause the processor to extract data associated with each of the set of unique patterns from the input data based on the plurality of sets of clusters. The stored processor-executable instructions, on execution, may further cause the processor to predict based on the extracted data, a failure of at least one interconnected system from the plurality of interconnected systems using a trained Machine Learning (ML) model. The stored processor-executable instructions, on execution, may further cause the processor to process the extracted data associated with each of the set of unique patterns and information associated with the predicted failure through a quantum computing layer. The quantum computing layer may use a plurality of qubits. The stored processor-executable instructions, on execution, may further cause the processor to generate through the quantum computing layer, at least one corrective action for the at least one interconnected system.

In one embodiment, a non-transitory computer-readable medium storing computer-executable instructions for predicting failures in interconnected systems based on quantum computing is disclosed. In one example, the stored instructions, when executed by a processor, may cause the processor to perform operations including identifying a set of unique patterns from input data received from a plurality of input data sources. The plurality of input data sources comprises a plurality of interconnected systems. The operations may further include determining a correlation between at least two of the plurality of input data sources. The operations may further include creating a plurality of sets of clusters corresponding to the plurality of input data sources based on the correlation. Each of the plurality of sets of clusters may include at least two input data sources. For each of the plurality of sets of clusters, correlation between corresponding input data sources may be above a predefined threshold. The operations may further include extracting data associated with each of the set of unique patterns from the input data based on the plurality of sets of clusters. The operations may further include predicting, based on the extracted data, a failure of at least one interconnected system from the plurality of interconnected systems using a trained Machine Learning (ML) model. The operations may further include processing the extracted data associated with each of the set of unique patterns and information associated with the predicted failure through a quantum computing layer. The quantum computing layer may use a plurality of qubits. The operations may further include generating through the quantum computing layer, at least one corrective action for the at least one interconnected system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 is an exemplary table representing a percentage change in a set of Key Performance Indicators (KPIs) over a plurality of iterations, in accordance with some embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
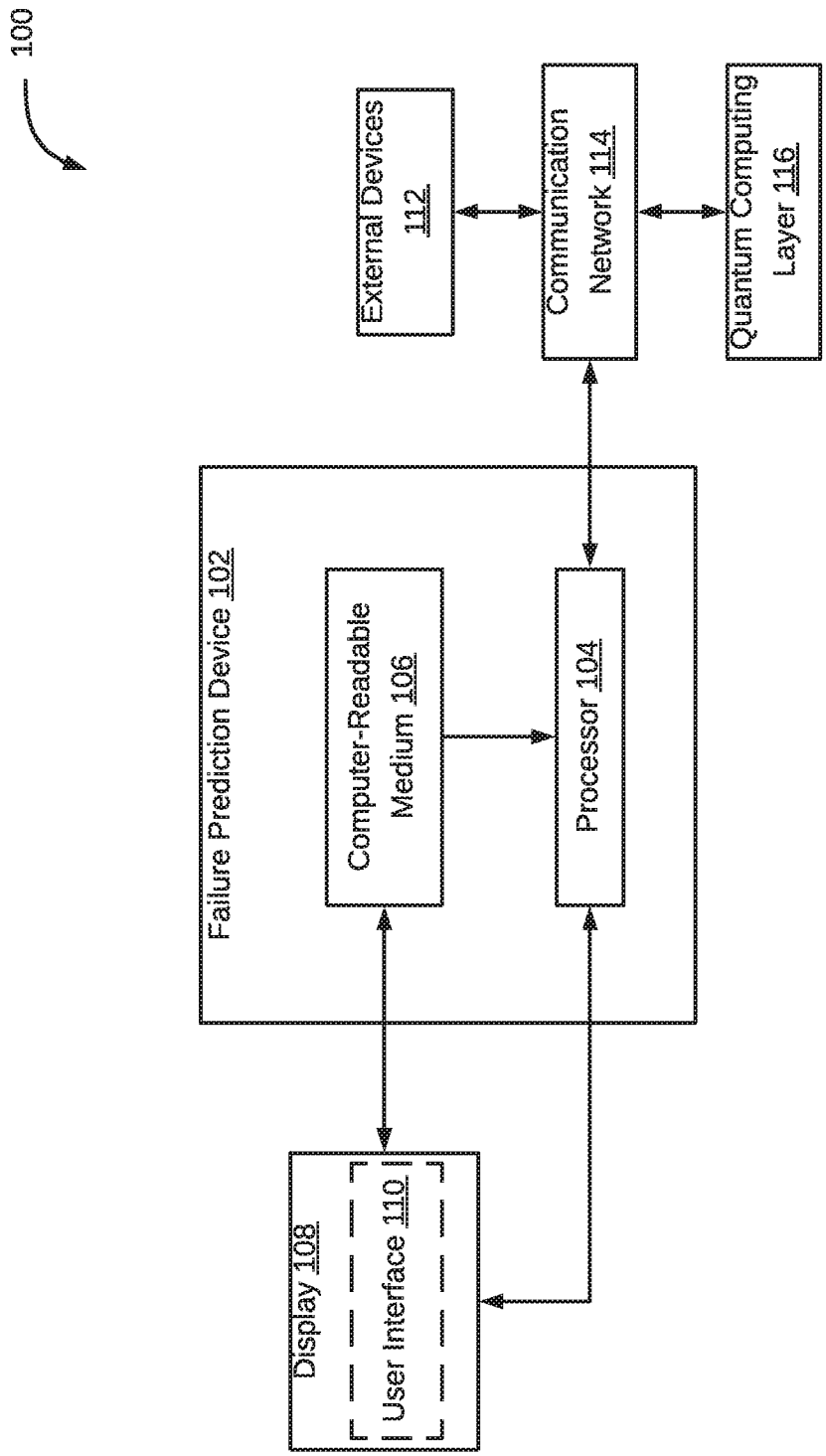
FIG. 1 is a block diagram of an exemplary system for predicting failures in interconnected systems based on quantum computing, in accordance with some embodiments.

Referring now to FIG. 1, an exemplary system 100 for predicting failures in interconnected systems based on quantum computing is illustrated, in accordance with some embodiments of the present disclosure. As will be appreciated, the system 100 may implement a failure prediction engine in order to predict failures in interconnected systems based on quantum computing. In particular, the system 100 may include a failure prediction device 102 (for example, server, desktop, laptop, notebook, netbook, tablet, smartphone, mobile phone, or any other computing device) that may implement the failure prediction engine. It should be noted that; in some embodiments, the failure prediction engine may apply a trained Machine Learning (ML) model to input data received from a plurality of input data sources so as to predict a failure of at least one of the plurality of input data sources through a quantum computing layer.

As will be described in greater detail in conjunction with FIGS. 2-6, the failure prediction device may identify a set of unique patterns from input data received from a plurality of input data sources. It may be noted that the plurality of input data sources may include a plurality of interconnected systems. The failure prediction device may further determine a correlation between at least two of the plurality of input data sources. The failure prediction device may further create a plurality of sets of clusters corresponding to the plurality of input data sources based on the correlation. It may be noted that each of the plurality of sets of clusters may include at least two input data sources. It may also be noted that for each of the plurality of sets of clusters, correlation between corresponding input data sources is above a predefined threshold. The failure prediction device may further extract data associated with each of the set of unique patterns from the input data based on the plurality of sets of clusters. The failure prediction device may further predict, based on the extracted data, a failure of at least one interconnected system from the plurality of interconnected systems using a trained Machine Learning (ML) model. The failure prediction device may further process the extracted data associated with each of the set of unique patterns and information associated with the predicted failure through a quantum computing layer. It may be noted that the quantum computing layer uses a plurality of qubits. The failure prediction device may further generate, through the quantum computing layer, at least one corrective action for the at least one interconnected system.

In some embodiments, the failure prediction device 102 may include one or more processors 104 and a computer-readable medium (for example, a memory) 106. The system 100 may further include a display 108. The computer-readable storage medium 106 may store instructions that, when executed by the one or more processors 104, cause the one or more processors 104 to predict failures in interconnected systems based on quantum computing, in accordance with aspects of the present disclosure. The computer-readable storage medium 106 may also store various data (for example, input data, moving parts data, static data, systems data, structured data, unstructured data, business application data, human generated content data, machine data, set of features, set of unique patterns, failure information, corrective action data, output data, and the like) that may be captured, processed, and/or required by the system 100. The system 100 may interact with a user via a user interface 110 accessible via the display 108. The system 100 may also interact with one or more external devices 112 over a communication network 114 for sending or receiving various data. The external devices 112 may include, but may not be limited to, a remote server, a digital device, or another computing system. Further, the failure prediction device 102 may interact with a quantum computing layer 116 over the communication network 114. It may be noted that the quantum computing layer 116 may process data received from the failure prediction device 102 using a plurality of qubits. In some embodiments, the quantum computing layer 116 may be a part of the processor 104.

Figure 2:
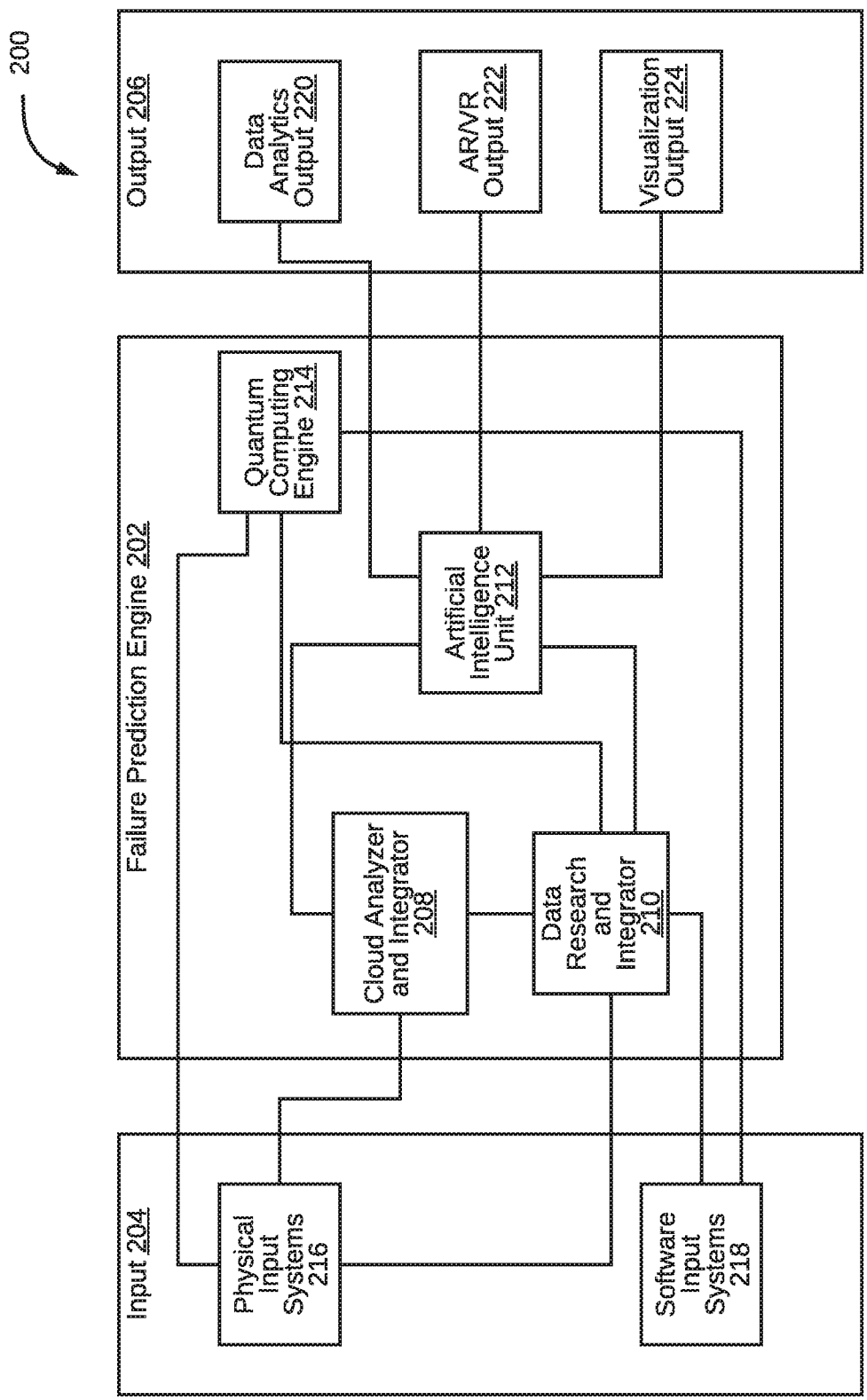
FIG. 2 is a functional block diagram of an exemplary system for predicting failures in interconnected systems based on quantum computing, in accordance with some embodiments.

Referring now to FIG. 2, a functional block diagram of a system 200 for predicting failures in interconnected systems based on quantum computing is illustrated, in accordance with some embodiments. The system 200 may include a failure prediction engine 202, an input 204, and an output 206. In some embodiments, the failure prediction engine 202 may be implemented by the failure prediction device 102 of the system 100. The failure prediction engine 202 may include a cloud analyzer and integrator 208, a data research and integrator 210, an Artificial Intelligence (AI) unit 212, and a quantum computing engine 214, It may be noted that the input 204 may include the plurality of input data sources such as physical input systems 216 and software input systems 218. Some examples of the physical input systems 216 may be handheld devices, a forklift, Autonomous Ground Vehicles (AGVs), an Automated Storage and Retrieval System (ASRS), a plurality of trucks, gate in blockers, a conveyer belt, and the like. By way of an example, the software input systems 218 may include Enterprise Resource Planning (ERP), Further, the physical input systems 216 and the software input systems 218 may send the input data to the cloud analyzer and integrator 208.

The cloud analyzer and integrator 208 may store the input data in a cloud based repository. Further, the cloud analyzer and integrator 208 may send the input data to the data research and integrator 210 and the AI unit 212, The data research and integrator 210 may process the input data to obtain an integrated data using a data cleaning system (not shown). By way of an example, the data cleaning system may be Splunk®. Further, the data research and integrator 210 may send the integrated data to the AI unit 212 and receive the output 206 from the AI unit 212. The AI unit 212 may include a trained ML model to predict a failure of at least one interconnected system from the plurality of interconnected systems. Further, the AI unit 212 may send the output 206 to the quantum computing engine 214, The output 206 may include a data analytics output 220, an Augmented Reality/Virtual Reality (AR/VR) output 222, and a visualization output 224. It may be noted that the output 206 may be a result determined by the AI unit 212. In some exemplary scenarios, the result may include a failure information of at least one interconnected system from the plurality of interconnected systems. The data analytics and output 220 may be an interim output for each of a plurality of data processing steps in real-time and may be used to perform debugging.

By way of an example of a supply chain network, the plurality of data processing steps may include a current status of an activity of the plurality of interconnected systems, loading, shipping, and the like. The AR/VR output 222 may provide the output 206 as an AR/VR experience for a user. It may be noted that the AR/VR output 222 may be used for training the user or tracking the supply chain network. The visualization output 224 may provide the output 206 in real-time, using graphics. The quantum computing engine 214 may connect with each of the cloud analyzer and integrator 208, the data research and integrator 210, and the AI unit 212. It may be noted that the quantum computing engine 214 may also receive the input data from the input 204. In some embodiments, the quantum computing engine 214 may be analogous to the quantum computing layer 116 of the system 100.

It should be noted that all such aforementioned modules 202-224 may be represented as a single module or a combination of different modules. Further, as will be appreciated by those skilled in the art, each of the modules 202-224 may reside, in whole or in parts, on one device or multiple devices in communication with each other. In some embodiments, each of the modules 202-224 may be implemented as dedicated hardware circuit comprising custom application-specific integrated circuit (ASIC) or gate arrays, off-the-shelf semiconductors such as logic chips, transistors, or other discrete components. Each of the modules 202-224 may also be implemented in a programmable hardware device such as a field programmable gate array (FPGA), programmable array logic, programmable logic device, and so forth. Alternatively, each of the modules 202-224 may be implemented in software for execution by various types of processors (e.g., processor 104). An identified module of executable code may, for instance, include one or more physical or logical blocks of computer instructions which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for predicting failures in interconnected systems based on quantum computing. For example, the exemplary system 100 and the associated failure prediction device 102 may extract software development requirements from natural language information by the processes discussed herein. In particular, as will be appreciated by those of ordinary skill in the art, control logic and/or automated routines for performing the techniques and steps described herein may be implemented by the system 100 and the associated failure prediction device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
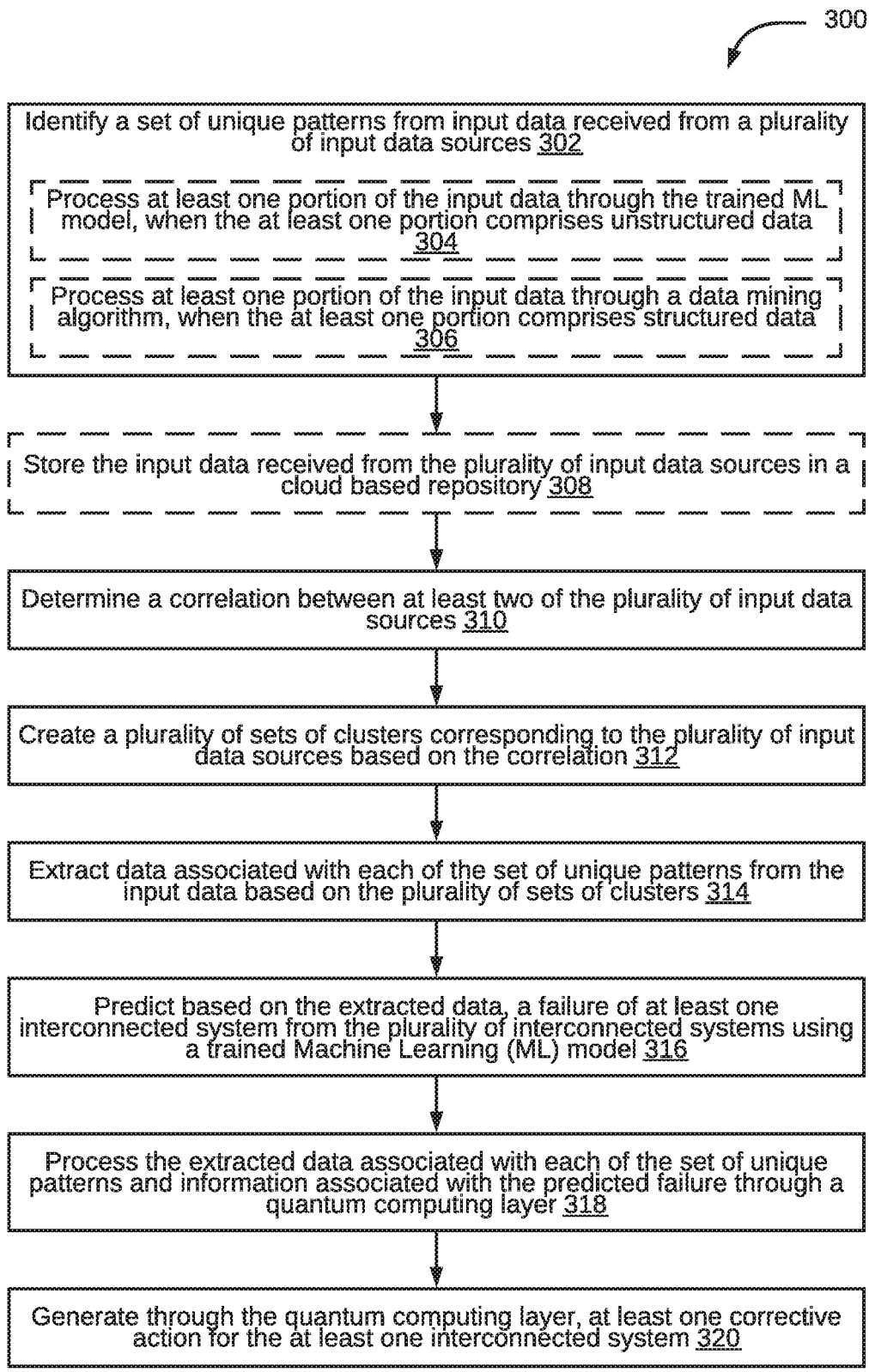
FIG. 3 is a flow diagram of an exemplary control logic for predicting failures in interconnected systems based on quantum computing, in accordance with some embodiments.

Referring now to FIG. 3, an exemplary control logic 300 for predicting failures in interconnected systems based on quantum computing is depicted via a flowchart, in accordance with some embodiments. In an embodiment, the control logic 300 may be executed by a system, such as the system 100 or the failure prediction device 102. The control logic 300 may include identifying a set of unique patterns from input data received from a plurality of input data sources, at step 302. It may be noted that the plurality of input data sources may include a plurality of interconnected systems. In some embodiments, the plurality of interconnected systems may include at least one of software applications and Internet of Things (IoT) enabled devices analogous to the software input systems 218 and the physical input systems 216, respectively, of the system 200. It may be noted that identifying the set of unique patterns from the input data at 302 may further include at least one of processing at least one portion of the input data through the trained ML model, when the at least one portion comprises unstructured data, at step 304, or processing at least one portion of the input data through a data mining algorithm, when the at least one portion comprises structured data, at step 306.

Further, the control logic 300 may include, at step 308, storing the input data received from the plurality of input data sources in a cloud based repository. It may be noted that the plurality of sets of clusters is created on a cloud computing layer associated with the cloud based repository. Further, the control logic 300 may include, at step 310, determining a correlation between at least two of the plurality of input data sources. Further, the control logic 300 may include, at step 312, creating a plurality of sets of clusters corresponding to the plurality of input data sources based on the correlation. It may be noted that each of the plurality of sets of clusters may include at least two input data sources. It may also be noted that for each of the plurality of sets of clusters, correlation between corresponding input data sources is above a predefined threshold. Further, the control logic 300 may include, at step 314, extracting data associated with each of the set of unique patterns from the input data based on the plurality of sets of clusters.

Further, the control logic 300 may include, at step 316, predicting based on the extracted data, a failure of at least one interconnected system from the plurality of interconnected systems using a trained ML model. In some embodiments, the trained ML model may be based on a K-Nearest Neighbour (KNN) model. Further, the control logic 300 may include, at step 318, processing the extracted data associated with each of the set of unique patterns and information associated with the predicted failure through the quantum computing layer 116. It may be noted that the quantum computing layer uses a plurality of qubits. Further, the control logic 300 may include, at step 320, generating, through the quantum computing layer 116, at least one corrective action for the at least one interconnected system.

Figure 4:
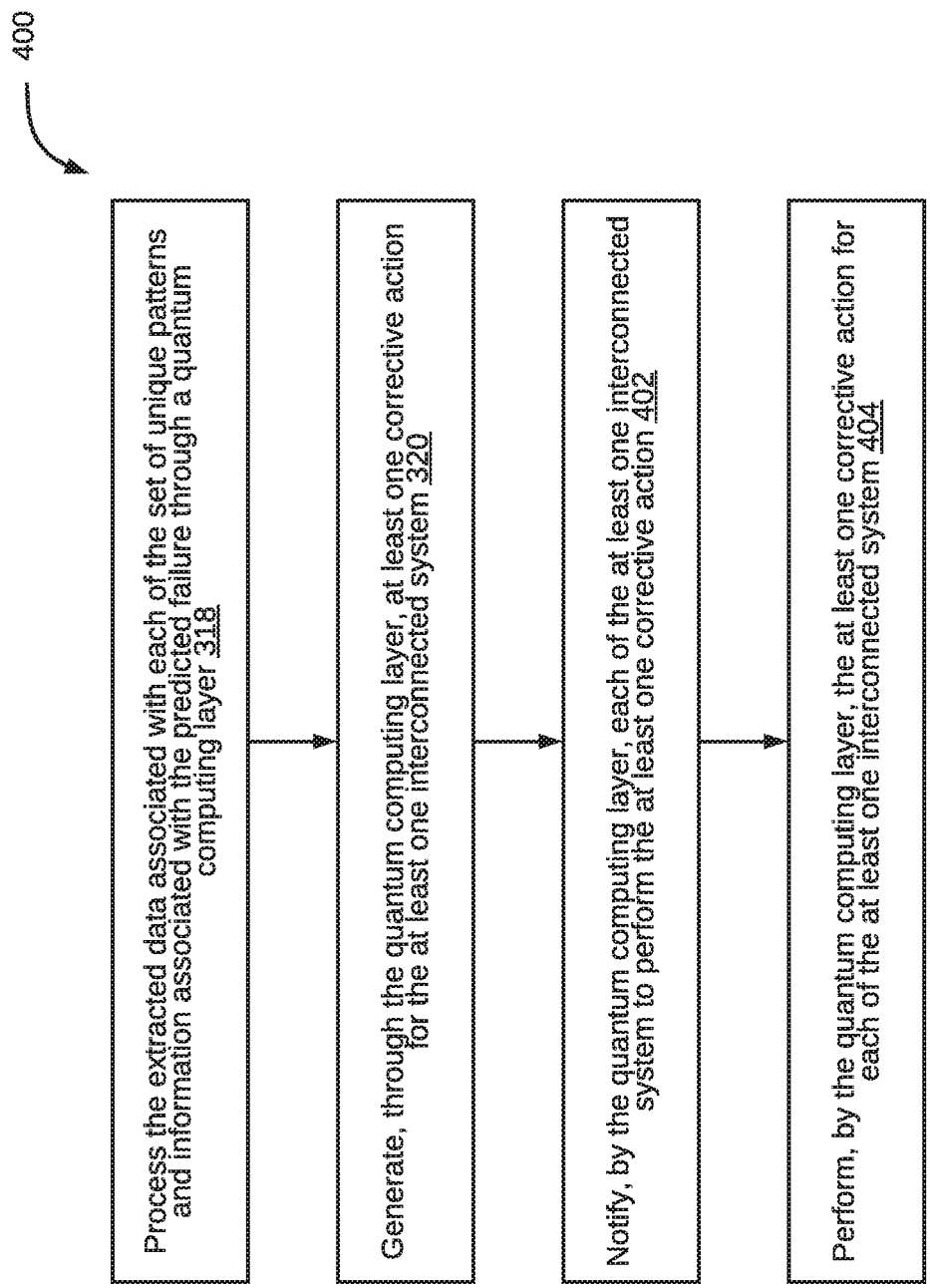
FIG. 4 is a flow diagram of an exemplary control logic for performing at least one corrective action for at least one interconnected system using a quantum computing layer, in accordance with some embodiments.

Referring now to FIG. 4, an exemplary control logic 400 for performing at least one corrective action for at least one interconnected system using a quantum computing layer is depicted via a flowchart, in accordance with some embodiments. In an embodiment, the control logic 400 may be executed in conjunction with the control logic 300. In some embodiments, the control logic 400 may include the steps 318 and 320 of the control logic 300. Further, the control logic 400 may include, at step 402, notifying, by the quantum computing layer 116, each of the at least one interconnected system to perform the at least one corrective action. Further, the control logic 400 may include, at step 404, performing, by the quantum computing layer 116, the at least one corrective action for each of the at least one interconnected system.

Figure 5:
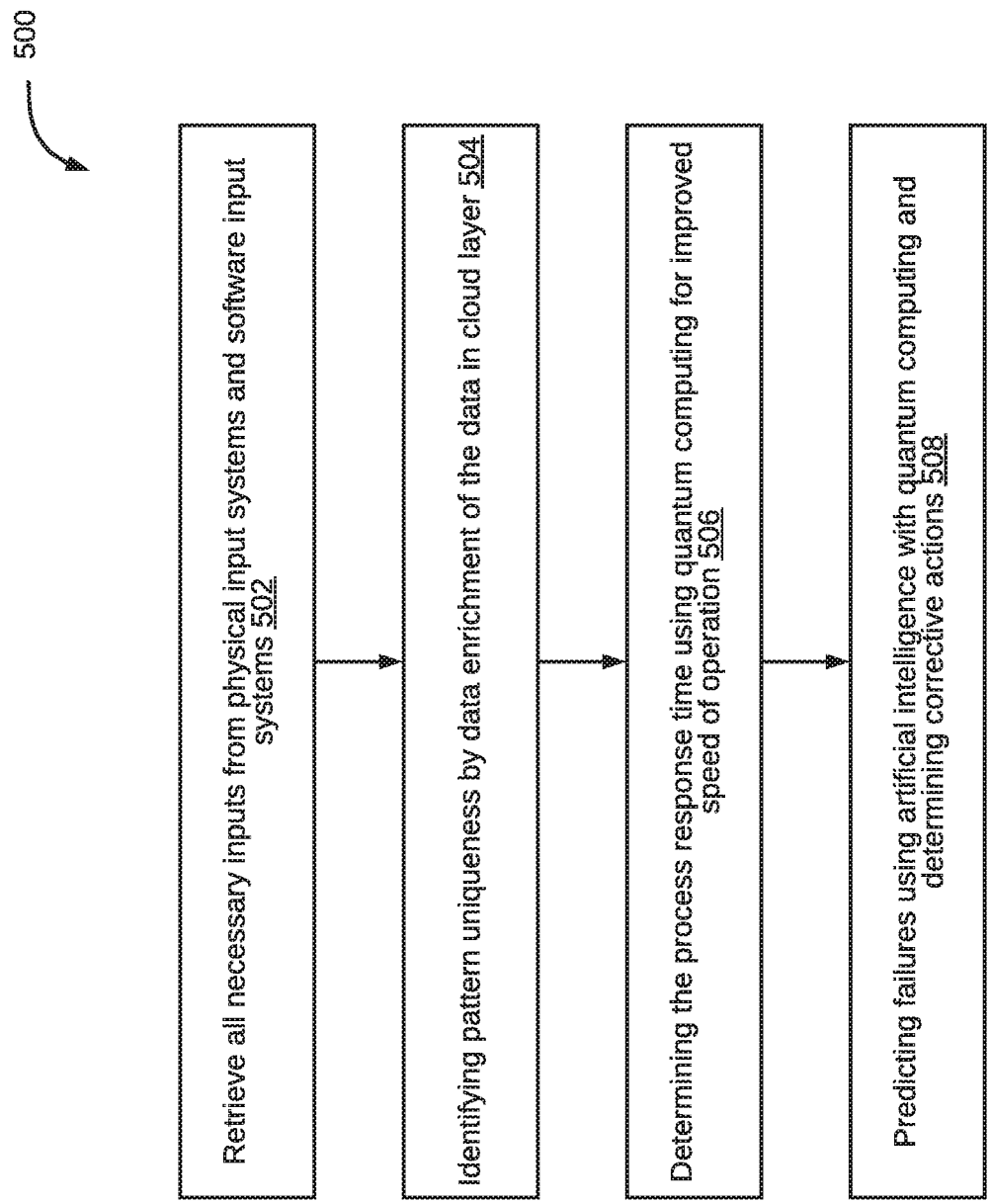
FIG. 5 is a flow diagram of a detailed exemplary control logic for predicting failures in interconnected systems based on quantum computing, in accordance with some embodiments.

Referring now to FIG. 5, a detailed exemplary control logic 500 for predicting failures in interconnected systems based on quantum computing is depicted via a flowchart, in accordance with some embodiments. The control logic 500 may include, at step 502, retrieving the input data from the physical input systems 216 and the software input systems 218. In some embodiments, the failure prediction engine 202 may receive the input 204 in real-time. In some exemplary scenarios, the input 204 may be one of a moving parts data, a static data, and a systems data, based on a source of the input data. It may be noted that the moving parts data may include the input data received from a moving part in the supply chain network. By way of an example, the moving part may be the AGV, the ASRS, the conveyer belt, the forklift, the plurality of trucks, and the like. In some embodiments, the moving parts data may be in a form of a device location, a direction of movement, a waiting time, an order number, a breakdown flag, and a Global Positioning System (GPS) location tracker. As will be appreciated, in the supply chain network, the moving parts data may provide tracking information of an order and a set of tracking insights may be obtained from the moving parts data.

Further, the static data may be the input data describing an event. By way of an example, the static data may be the input data obtained from one of the conveyer belt, the handheld devices, and the like, in a form of a scanning data. In some embodiments, the static data may include an event data, a time of the order, and a Programmable Logic Controller (PLC) address for each of the plurality of input devices. Further, the systems data may be the input data received from the software input systems 218. By way of an example, the systems data may include an order number, a transaction number, a correlation Identity (ID), a database status, and the like. In some embodiments, the data research and integrator 210 may combine the systems data with the scanning data and the moving parts data and send a combined data to the AI unit 212 to provide the output 206.

Further, the control logic 500 may include, at step 504, identifying a set of unique patterns by data enrichment of the input data in the cloud analyzer and integrator 208. In some embodiments, the cloud analyzer and integrator 208 may provide a data lake to combine each data elements constituting the input data. It may be noted that the cloud analyzer and integrator 208 may allow combining each data of the input data and select a set of features for further computations. It may be noted that a schema for the input data may be at least one of a non-relational and a relational, allowing the input data from the IoT enabled devices to be received and utilized in the cloud analyzer and integrator 208. As has been explained in conjunction with FIG. 2, the cloud analyzer and integrator 208 may store the input 204. In some embodiments, the ERP may provide data to the cloud analyzer and integrator 208. In such embodiments, the data received from the ERP may be combined with each data of the input data in the cloud analyzer and integrator 208.

By way of an example, a data table may be created by linking each data of the input data with an order Identity (ID). Further, the correlation may be determined between the at least two of the plurality of input data sources using the order ID as a common data. In some embodiments, the order ID may be determined based on the correlation using an ML algorithm. Further, the data cleaning system may be used by the data research and integrator 210 for performing a log analysis and a data research. An example of the data cleaning system may be Splunk®. It may be noted that based on a type of data, the input 204 may be one of a business data, a human-generated content, and a machine data. The business data may include digital information used by the organization to perform a set of operations. By way of an example, the set of operations may include a payroll, a supply chain, financial data, and the like. In most embodiments, the business data may be stored in a relational database. Further, the business data may be stored in a software with pre-defined data structures or schema to organize, store, access, and report structured data.

The human-generated content may be digital information received from a set of human-to-human (H2H) interactions. By way of an example, the set of H2H interactions may include email, spreadsheets and documents, mobile text messages, video recordings, photos, audio recordings, social media messaging, and the like. Further, the human-generated content may be received as unstructured data. As will be appreciated, a relational database may not be suitable to store the unstructured data. The machine data may be received continuously throughout a day. Further, the machine data may be provided by at least one of software applications and IoT enabled devices. As will be appreciated, the software applications, servers, network devices, sensors, browsers, desktop and laptop computers, mobile devices, and any other processor-based systems used for supporting the set of operations, may be continuously generating the input data. By way of an example, the other processor-based systems may include smart electrical meters, GPS devices, Radio Frequency Identification (RFID) tags, automobiles, medical devices with embedded electronic devices, and the like. In some embodiments, the machine data may be in various formats such as, application log files, call detail records, a clickstream data associated with a plurality of user-web interactions, data files, system configuration files, alerts, tickets, and the like. It may be noted that the machine data may be generated by at least one of a machine-to-machine (M2M) interaction and a human-to-machine (H2M) interaction. Further, the machine data may be one of structured data, unstructured data, or a combination thereof.

It may be noted that the organization may require an end-to-end visibility, analytics, a real-time intelligence across the software applications, services, and an IT infrastructure for achieving target service levels, managing costs, mitigating security risks, maintaining compliance, and gaining new insights to improve decision-making. Further, the machine data may provide a time-stamped record of a plurality of events. It may be noted that the plurality of events may include a set of current events and a set of historical events, within and outside the organization. It may also be noted that the plurality of events may include performances of the software applications and the IoT enabled devices, a user activity, system configuration changes, electronic transaction records, security alerts, error messages, device locations, and the like. In some embodiments, the machine data may be generated in a plurality of formats and a plurality of structures, from each of the software applications and the IoT enabled devices. It may be noted that the machine data may vary amongst a plurality of vendors and amongst product types, families, and models of a same vendor.

Further, the failure prediction engine 202 may identify the set of unique patterns from the input 204. It may be noted that for the structured data, the set of unique patterns may be identified through a data mining algorithm, and for the unstructured data, the set of unique patterns may be identified through the trained ML model. By way of an example, the structured data may include the order ID, a Purchase Order (PO) reference number, and the like. Further, the input 204 may be sent to a pattern identifier. In some embodiments, the pattern identifier may be implemented by the data research and integrator 210. Further, the pattern identifier may identify a set of common patterns and the set of unique patterns from the input 204. By way of an example, the set of unique patterns for the structured data may include, the PO reference number, the order ID, and the like. Further, the set of unique patterns may be identified using the data mining algorithm. In some embodiments, the data mining algorithm may be based on association. By way of an example, an association-based data mining algorithm may be executed by InfoSphere® Warehouse. It may be noted that within InfoSphere® Warehouse, a wizard may provide configurations of an information flow that may be used in association by evaluating the plurality of input data sources, a decision basis, and the output 206.

Further, the plurality of sets of clusters may be created based on the correlation between the at least two of the plurality of input data sources. In some embodiments, the data research and integrator 210 may create the plurality of sets of clusters. It may be noted that the plurality of sets of clusters may be created based on one or more attributes, to form a structured opinion. In some embodiments, the one or more attributes may be the set of unique patterns. As will be appreciated, creating the plurality of sets of clusters may allow identification of similarities and ranges of the plurality of input data sources. Further, data may be extracted separately from each of the plurality of sets of clusters. In some exemplary scenarios, the data may be extracted by the data research and integrator 210 and sent to the cloud analyzer and integrator 208. It may be noted that the data extracted based on the set of unique patterns may provide a relevant dataset for predicting failures in interconnected systems based on quantum computing.

Further, the control logic 500 may include, at step 506, determining a process response time using the quantum computing engine 214 for increasing a speed of the failure prediction engine 202. The input 204 from each of the plurality of input data sources may be received by the cloud analyzer and integrator 208 and the data research and integrator 210. In some embodiments, the quantum computing engine 214 may receive data from each of the cloud analyzer and integrator 208, the data research and integrator 210, and the AI unit 212. Further, the quantum computing engine 214 may send the output 206 to each of the physical input systems 216 and the software input systems 218. As will be appreciated, the quantum computing engine 214 may process data based on a plurality of qubits. Further, the plurality of qubits may identify and respond to an optimized sequence of information. In some embodiments, the data extracted based on the plurality of sets of clusters may be accessible in the cloud analyzer and integrator 208. As will be appreciated, the quantum computing engine 214 may exponentially improve a speed of response of the operation. Further, an initial request for an access related query may be received from at least one of the cloud analyzer and integrator 208, the data research and integrator 210, and the AI unit 212. Additionally, the data may be processed using the plurality of qubits. In some embodiments, the quantum computing engine 214 may receive the input 204 of an input data source from the cloud analyzer and integrator 208 and send a response to the input data source immediately. It may be noted that the process response time is about 200 times faster and the plurality of interconnected systems may receive a quicker response for a faster reaction.

As may be appreciated, conventional bits in digital computers may be one of '0's and '1's and remain unchanged until a hardware is flawed. It may be noted that each of the plurality of qubits may have a probability of being '0' and a probability of being '1' but may be in an indefinite state until measured. Further, the indefinite state and an additional state information may be described as being at an arbitrary point on a sphere (of radius '1 unit'), reflecting both the probability of being '0' and the probability of being '1' (represented as north and south poles, respectively). It may also be noted that Bloch sphere may be used to represent a set of possible states of a qubit. Additionally, the state may be a combination of a plurality of values along each of three axes of the Bloch sphere, known as superposition. As will be appreciated, a quantum computer may perform computations on the qubit when the qubit is in superposition (changing probabilities in various ways through logic gates), before reading a result by measuring the qubit. Further, the qubit may be one of '0' or '1' upon being read and lose the additional state information. Further, the plurality of qubits may process the data in milliseconds and may read the data from the cloud analyzer and integrator 208 using entanglement. As will be appreciated, entangled qubits may affect each other instantly when measured.

Further, the control logic 500 may include, at step 508, predicting failures in interconnected systems using the AI unit 212 and the quantum computing engine 214, and determining corrective actions. It may be noted that the AI unit 212 may be interconnected with the quantum computing engine 214. The AI unit 212 may predict a failure of at least one interconnected system from the plurality of interconnected systems using the trained ML model. Further, the AI unit 212 may recognize the failure and send a failure information to the quantum computing engine 214. Further, the quantum computing engine 214 may process a plurality of combinations to compute and notify the at least one interconnected system with turn-around-time of the order of nano seconds for preventing the failure. In some embodiments, the AI unit 212 may predict the failure in the software input systems 218 and perform the corrective action through the quantum computing engine 214. In such embodiments, the corrective action may be preventing a code failure, providing an auto fix, and the like. Further, the quantum computing engine 214 may be connected to the physical input systems 216. By way of an example, the corrective action for the failure of at least one of the physical input systems 216 may be a quick change, a turn, a modification of movement, and the like. By way of an example, the set of unique patterns may be identified using the trained ML model based on unsupervised learning. In continuation of the example, the cloud analyzer and integrator 208 may send input data to a pattern extraction layer in the data research and integrator 210.

Further, the data may be received by the trained ML model of the AI unit 2012. In continuation of the example, the trained ML model may be based on a KNN algorithm. Further, a training dataset combined with a real-time input data may be sent to the trained ML model. Additionally, a set of features may be extracted based on the data received. Further, the trained ML model based on the KNN algorithm may process the data and predict the failure of the at least one interconnected system from the plurality of interconnected systems. Further, the AI unit 212 may send the failure information to the quantum computing engine 214. Further, the quantum computing engine 214 may process the failure information based on the plurality of qubits and send the failure information to the at least one interconnected system from the plurality of interconnected systems. Further, the AI unit 212 may send a corrective action to prevent the failure through the quantum computing engine 214.

Figure 6:
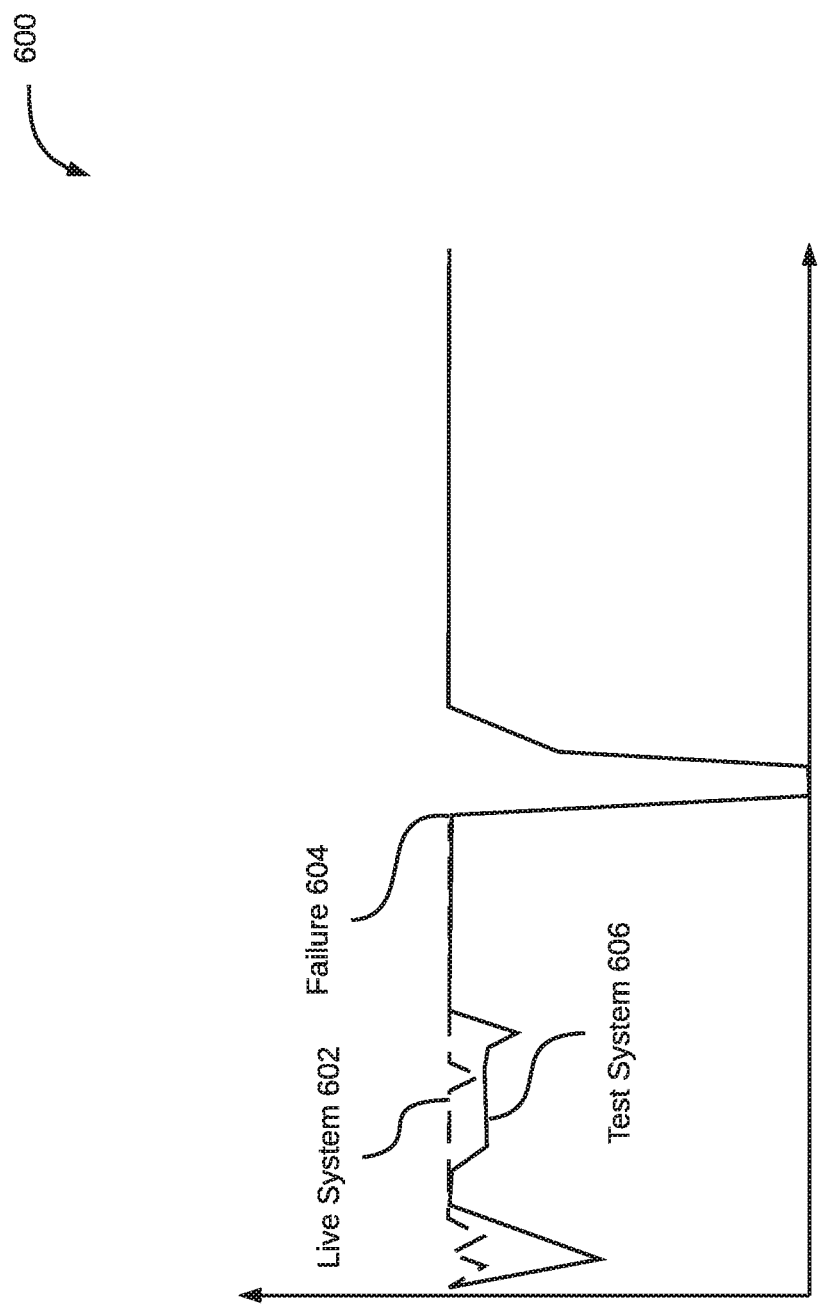
FIG. 6 illustrates an exemplary graphical representation of prediction of a failure of at least one interconnected system from a plurality of interconnected systems using a trained Machine Learning (ML) model, in accordance with some embodiments.

Referring now to FIG. 6, an exemplary graphical representation 600 of prediction of a failure of at least one interconnected system from a plurality of interconnected systems using a trained ML model is illustrated, in accordance with some embodiments. In the graphical representation 600, the AI unit 212 may process the input data received from the plurality of input data sources of a live system 602 and identify the set of unique patterns to predict a failure 604 in a test system 606. It may be noted that the test system 606 may be a simulation based on the input data. Further, the AI unit 212 may send the failure information to the quantum computing engine 214. The quantum computing engine 214 may process the failure information and notify the at least one interconnected system within nano seconds and prevent the failure. In some embodiments, the AI unit 212 may predict the failure 604 of at least one of the software input systems 218 and send the corrective action to the at least one of the software input systems 218 though the quantum computing engine 214, By way of an example, the corrective action may be preventing a code failure, auto fix, and the like.

Referring now to FIG. 7, an exemplary table 700 representing a percentage change in a set of Key Performance Indicators (KPIs) over a plurality of iterations, in accordance with some embodiments of the present disclosure. In table 700, the set of KPIs 702 includes a KPI 702*a*, KPI 702*b*, KPI 702*c*, KPI 702*d*, KPI 702*e*, and KPI 702*f*. A change in the set of KPIs may be monitored by comparing the set of KPIs when the failure prediction engine 202 is executed without the quantum computing engine 214 with the set of KPIs when the failure prediction engine 202 is executed with the quantum computing engine 214. Further, the change in the set of KPIs may be monitored over a plurality of iterations. By way of an example, the plurality of iterations may be M0, M1, M2, M3, M4, M5, and the like. Further, in table 700, the percentage change in the set of KPIs 702 shows an overall improvement in performance of the failure prediction engine 202 executing with the quantum computing engine 214 in each of the set of KPIs 702 upon completing a fifth of the plurality of iterations.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
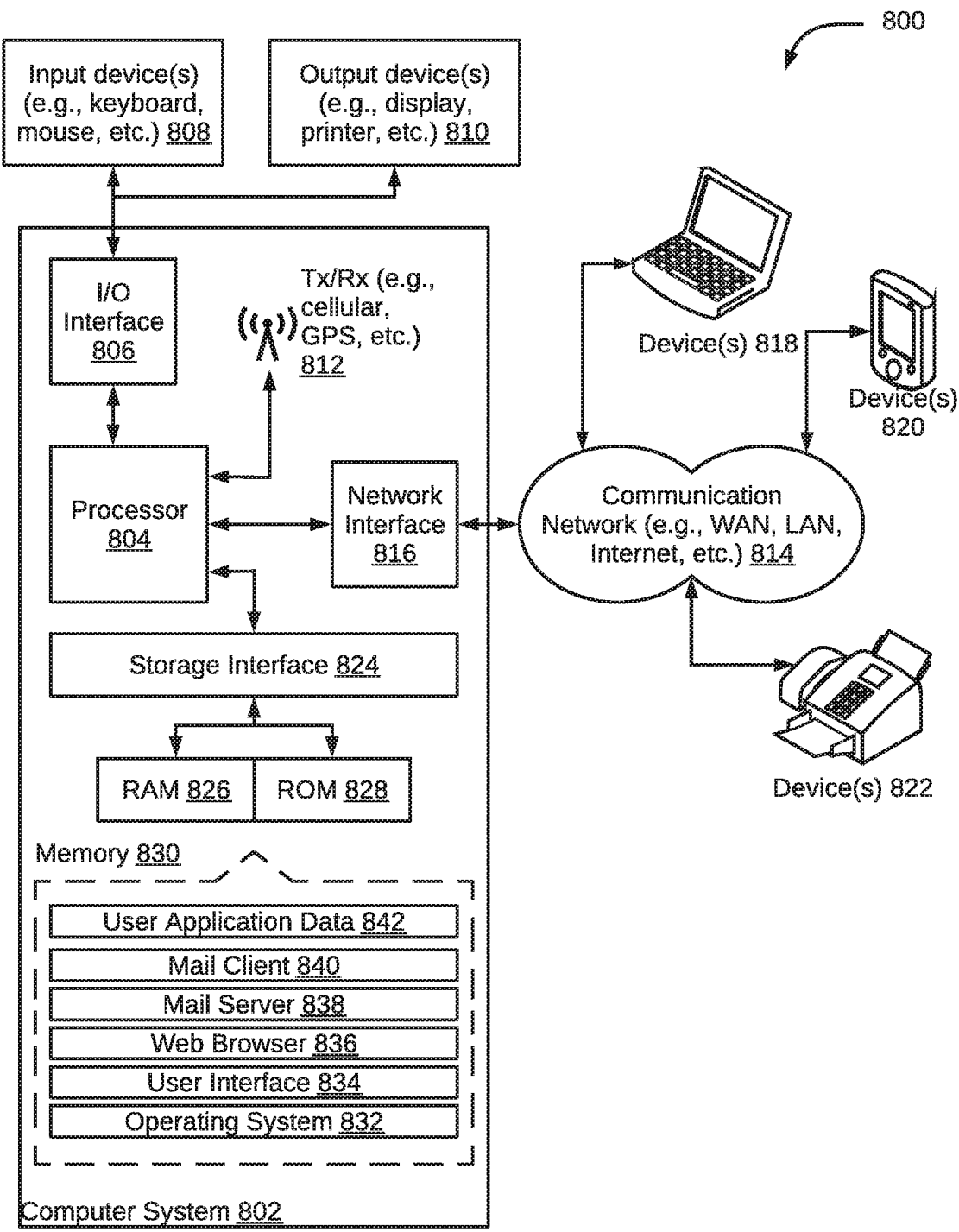
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 802 for implementing embodiments consistent with the present disclosure is illustrated. Variations of computer system 802 may be used for implementing system 100 for extracting software development requirements from natural language information. Computer system 802 may include a central processing unit ("CPU" or "processor") 804. Processor 804 may include at least one data processor for executing program components for executing user-generated or system-generated requests, A user may include a person, a person using a device such as such as those included in this disclosure, or such a device itself. The processor 804 may include specialized processing units such as integrated system (bus) controllers, memory management control units, floating point units, graphics processing units, digital signal processing units, etc. The processor 804 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via I/O interface 806. The I/O interface 806 may employ communication protocols/methods such as, without limitation, audio, analog, digital, monoaural, RCA, stereo, IEEE-1394, near field communication (NFC), FireWire®, Camera Link®, GigE®, serial bus, universal serial bus (USB), infrared, PS/2, BNC, coaxial, component, composite, digital visual interface (DVI), high-definition multimedia interface (HDMI®), radio frequency (RF) antennas, S-Video, Video Graphics Array® (VGA), IEEE® 802.n/b/g/n/x, Bluetooth®, cellular (e.g., code-division multiple access (CDMA), high-speed packet access (HSPA+), global system for mobile communications (GSM®), long-term evolution (LTE®) WiMAX®, or the like), etc.

Using the I/O interface 806, the computer system 802 may communicate with one or more I/O devices. For example, the input device 808 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 810 may be a printer, fax machine, video display (e.g., cathode ray tube (CRT), liquid crystal display (LCD), light-emitting diode (LED), plasma, or the like), audio speaker, etc. In some embodiments, a transceiver 812 may be disposed in connection with the processor 804. The transceiver 812 may facilitate various types of wireless transmission or reception. For example, the transceiver 812 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 804 may be disposed in communication with a communication network 816 via a network interface 814. The network interface 814 may communicate with the communication network 816. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 816 may include, without limitation, a direct interconnection, local area network (LAN), wide area network (WAN), wireless network (e.g., using Wireless Application Protocol), the Internet, etc. Using the network interface 814 and the communication network 816, the computer system 802 may communicate with devices 818, 820, and 822. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 802 may itself embody one or more of these devices.

In some embodiments, the processor 804 may be disposed in communication with one or more memory devices (e.g., RAM 826, ROM 828, etc.) via a storage interface 824. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 832, user interface application 834, web browser 836, mail server 838, mail client 840, user/application data 842 (e.g., any data variables or data records discussed in this disclosure), etc. The operating system 832 may facilitate resource management and operation of the computer system 802. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOGGLE® ANDROID®, BLACKBERRY® OS, or the like. User interface 834 may facilitate display, execution, interaction, manipulation, or operation of program components through textual or graphical facilities. For example, user interfaces may provide computer interaction interface elements on a display system operatively connected to the computer system 802, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 802 may implement a web browser 836 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 802 may implement a mail server 838 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 802 may implement a mail client 840 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 802 may store user/application data 842, such as the data, variables, records, etc. (e.g., input data, moving parts data, static data, systems data, structured data, unstructured data, business application data, human generated content data, machine data, set of features, set of unique patterns, failure information, corrective action data, output data, predictive models (trained ML model, pattern identification model, data mining model, etc.), and so forth) as described in this disclosure. Such databases may be implemented as fault-tolerant, relational, scalable, secure databases such as ORACLE® or SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for predicting failures in interconnected systems. The techniques employ the trained ML model and quantum computing in order to achieve the same. The trained ML model and quantum computing help in predicting failures in interconnected systems based on the input data received from the plurality of input data sources, and therefore, predict failures and perform corrective actions with a faster response time. Further, the application of quantum computing may significantly reduce an amount of time taken to process the input data from the plurality of input data sources. Further, the cloud repository may store the input data from the plurality of input data sources and provide a data lake for each of the plurality of input data sources. Further, a visualization output may provide real time data of an event feed in the system.

The specification has described a method and system for predicting failures in interconnected systems based on quantum computing. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for predicting failures in interconnected systems based on quantum computing, the method comprising:
   identifying, by a failure prediction device, a set of unique patterns from input data received from a plurality of input data sources, wherein the plurality of input data sources comprises a plurality of interconnected systems, wherein identifying the set of unique patterns from the input data comprises at least one of processing at least one portion of the input data through a trained Machine Learning (ML) model, when the at least one portion comprises unstructured data, and processing at least one portion of the input data through a data mining algorithm, when the at least one portion comprises structured data;
   determining, by the failure prediction device, a correlation between at least two of the plurality of input data sources;
   creating, by the failure prediction device, a plurality of sets of clusters corresponding to the plurality of input data sources based on the correlation, wherein each of the plurality of sets of clusters comprises at least two input data sources, and wherein, for each of the plurality of sets of clusters, correlation between corresponding input data sources is above a predefined threshold;
   extracting, by the failure prediction device, data associated with each of the set of unique patterns from the input data based on the plurality of sets of clusters;
   predicting, by the failure prediction device, based on the extracted data, a failure of at least one interconnected system from the plurality of interconnected systems using the trained ML model;
   processing, by the failure prediction device, the extracted data associated with each of the set of unique patterns and information associated with the predicted failure through a quantum computing layer, wherein the quantum computing layer uses a plurality of qubits to process the extracted data and to further identify and respond to an optimized sequence of information; and generating, by the failure prediction device, through the quantum computing layer, at least one corrective action for the at least one interconnected system.

2. The method of claim 1, further comprising notifying, by the quantum computing layer, each of the at least one interconnected system to perform the at least one corrective action.

3. The method of claim 1, further comprising performing, by the quantum computing layer, the at least one corrective action for each of the at least one interconnected system.

4. The method of claim 1, wherein the plurality of interconnected systems comprises at least one of software applications and Internet of Things (IoT) enabled devices.

5. The method of claim 1, further comprising storing the input data received from the plurality of input data sources in a cloud based repository, wherein the plurality of sets of clusters are created on a cloud computing layer associated with the cloud based repository.

6. The method of claim 1, wherein the trained ML model is based on a K-Nearest Neighbour (KNN) model.

7. A system for predicting failures in interconnected systems based on quantum computing, the system comprising:
a processor; and
a computer-readable medium communicatively coupled to the processor,
wherein the computer-readable medium stores processor-executable instructions, which when executed by the processor, cause the processor to:
identify a set of unique patterns from input data received from a plurality of input data sources, wherein the plurality of input data sources comprises a plurality of interconnected systems, wherein identifying the set of unique patterns from the input data comprises at least one of processing at least one portion of the input data through a trained Machine Learning (ML) model, when the at least one portion comprises unstructured data, and processing at least one portion of the input data through a data mining algorithm, when the at least one portion comprises structured data;
determine a correlation between at least two of the plurality of input data sources;
create a plurality of sets of clusters corresponding to the plurality of input data sources based on the correlation, wherein each of the plurality of sets of clusters comprises at least two input data sources, and wherein, for each of the plurality of sets of clusters, correlation between corresponding input data sources is above a predefined threshold;
extract data associated with each of the set of unique patterns from the input data based on the plurality of sets of clusters;
predict, based on the extracted data, a failure of at least one interconnected system from the plurality of interconnected systems using the trained ML model;
process the extracted data associated with each of the set of unique patterns and information associated with the predicted failure through a quantum computing layer, wherein the quantum computing layer uses a plurality of qubits to process the extracted data and to further identify and respond to an optimized sequence of information; and generate, through the quantum computing layer, at least one corrective action for the at least one interconnected system.

8. The system of claim 7, wherein the processor-executable instructions, on execution, further cause the processor to notify, by the quantum computing layer, each of the at least one interconnected system to perform the at least one corrective action.

9. The system of claim 7, wherein the processor-executable instructions, on execution, further cause the processor to perform, by the quantum computing layer, the at least one corrective action for each of the at least one interconnected system.

10. The system of claim 7, wherein the plurality of interconnected systems comprises at least one of software applications and Internet of Things (IoT) enabled devices.

11. The system of claim 7, wherein the processor-executable instructions, on execution, further cause the processor to store the input data received from the plurality of input data sources in a cloud based repository, wherein the plurality of sets of clusters are created on a cloud computing layer associated with the cloud based repository.

12. The system of claim 7, wherein the trained ML model is based on a K-Nearest Neighbour (KNN) model.

13. A non-transitory computer-readable medium storing computer-executable instructions for predicting failures in interconnected systems based on quantum computing, the computer-executable instructions configured for:
identifying a set of unique patterns from input data received from a plurality of input data sources, wherein the plurality of input data sources comprises a plurality of interconnected systems, wherein identifying the set of unique patterns from the input data comprises at least one of processing at least one portion of the input data through a trained Machine Learning (ML) model, when the at least one portion comprises unstructured data, and processing at least one portion of the input data through a data mining algorithm, when the at least one portion comprises structured data;
determining a correlation between at least two of the plurality of input data sources;
creating a plurality of sets of clusters corresponding to the plurality of input data sources based on the correlation, wherein each of the plurality of sets of clusters comprises at least two input data sources, and wherein, for each of the plurality of sets of clusters; correlation between corresponding input data sources is above a predefined threshold;
extracting data associated with each of the set of unique patterns from the input data based on the plurality of sets of clusters;
predicting, based on the extracted data, a failure of at least one interconnected system from the plurality of interconnected systems using the trained ML model;
processing the extracted data associated with each of the set of unique patterns and information associated with the predicted failure through a quantum computing layer, wherein the quantum computing layer uses a plurality of qubits to process the extracted data and to further identify and respond to an optimized sequence of information; and
generating through the quantum computing layer, at least one corrective action for the at least one interconnected system.

14. The non-transitory computer-readable medium of claim 13, wherein the computer-executable instructions are further configured for:

notifying, by the quantum computing layer, each of the at least one interconnected system to perform the at least one corrective action; and performing, by the quantum computing layer, the at least one corrective action for each of the at least one interconnected system.

15. The non-transitory computer-readable medium of claim 13, wherein the computer-executable instructions are further configured for storing the input data received from the plurality of input data sources in a cloud based repository, wherein the plurality of sets of clusters are created on a cloud computing layer associated with the cloud based repository.

\* \* \* \* \*